Patented Aug. 9, 1932

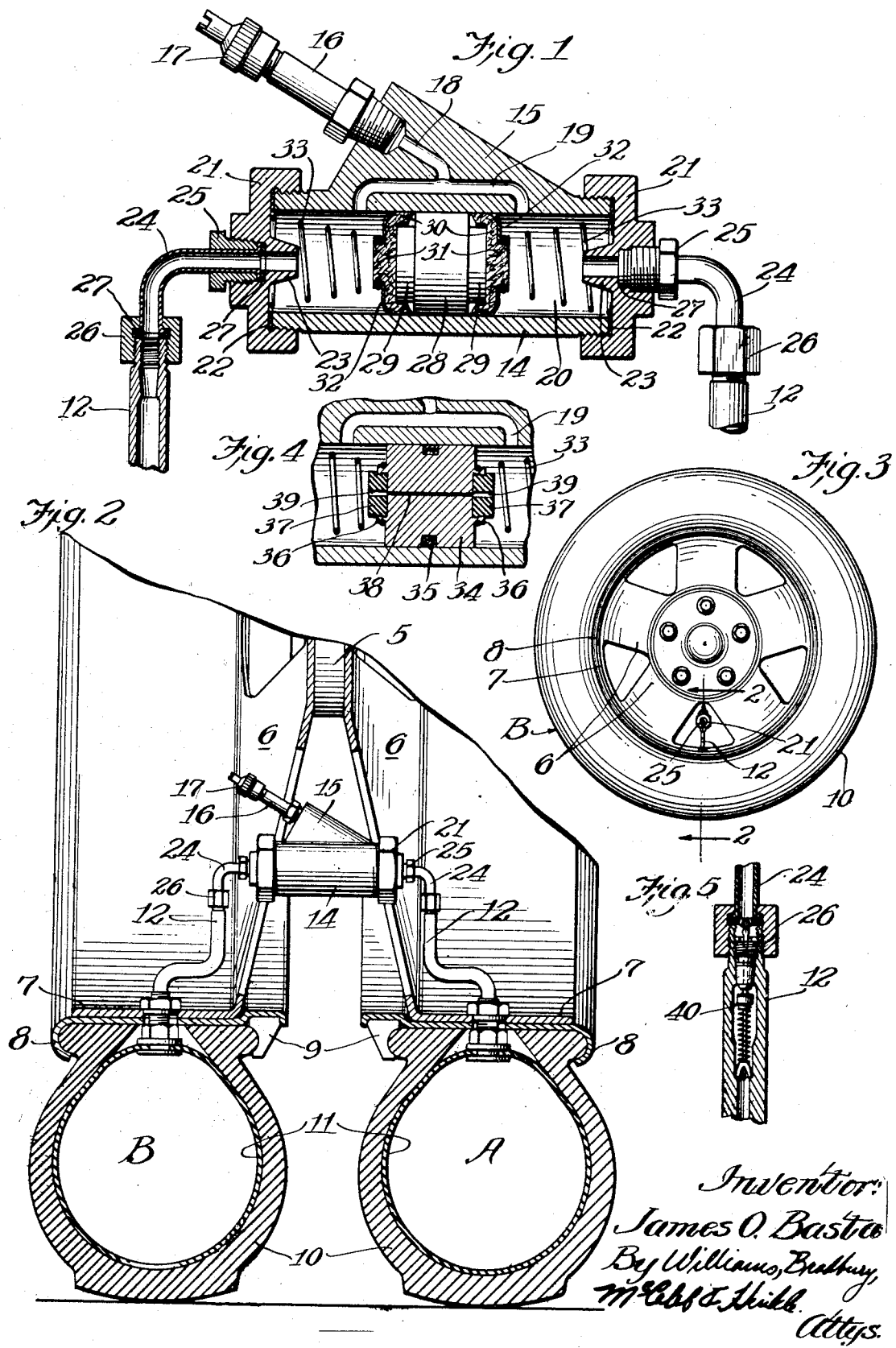

1,870,484

UNITED STATES PATENT OFFICE

JAMES O. BASTA, OF OAK PARK, ILLINOIS

TWIN TIRE PRESSURE CONTROL MEANS

Application filed June 18, 1931. Serial No. 545,166.

My invention relates to pressure control means for twin tires such as are now commonly employed on trucks, busses and other vehicles. By "twin tires" I means a pair of tires which rotate together as parts of one wheel or as parts of relatively fixed contiguous wheels.

Among its objects my invention has the following:

1. To provide means for inflating twin tires simultaneously and to precisely the same pressure.

2. To provide means for causing an increase of pressure within one tire to be reflected by corresponding increase of pressure within the other tire.

3. To provide means for preventing a rapid decrease in the pressure of one twin tire (i. e. a decrease caused by a blow-out or large puncture) from being reflected by a sudden decrease in the pressure of the other twin tire.

4. To provide means adapted to permit both of the twin tires to respond alike to a slight puncture or other slow leak affecting one of them.

5. To accomplish the foregoing objects by a device which is of simple construction, economical to manufacture and readily applicable to twin tires of the kind now in common use.

Other features, objects and advantages of the invention will appear from the following detailed description, wherein reference is made to the accompanying drawing, in which Figure 1 is an axial sectional view of the device of the present invention;

Figure 2 is a fragmentary view, taken on the line 2—2 of Figure 3, partly in section, of a wheel equipped with twin tires having the device of the present invention operatively associated therewith;

Figure 3 is an elevational view of the wheel of Figure 2;

Figure 4 is a fragmentary detail sectional view illustrating a modified construction of the normally balanced piston of the pressure control means of the present invention; and Figure 5 is a fragmentary sectional view illustrating a modification of my invention wherein I retain and make use of the check valves or "valve insides" with which the inflation stems of the twin tires ordinarily are provided.

Similar characters of reference refer to similar parts throughout the several views.

In Figures 2 and 3 I have illustrated a familiar type of wheel equipped with twin tires, said wheel comprising a hub portion 5, spoke or web members 6—6, wheel drums 7—7, tire rims 8—8, split rings 9—9 for retaining the tires on the rims, and twin tires A and B. Each tire comprises the usual casing 10, inner tube 11, and metal inflation stem 12, the inflation stems preferably, but not necessarily, being oppositely disposed to facilitate their connection with other common inflation and pressure control means presently to be described in detail.

As thus far described, the several parts are or may be of conventional or any suitable construction. Therefore, I have shown only so much of their detail as seems necessary to a clear understanding of the present invention. In addition it will suffice to say that the twin tires A and B rotate together as component parts of the same wheel, as herein illustrated, or as parts of contiguous wheels operating together and functioning as one wheel.

Ordinarily the inflation stems 12—12 will be provided with the usual check valve unit or "valve insides" held in position by the internal threads at the outer ends of the stems. I may dispense with the "valve insides" at these points, as is illustrated in Figure 1, or I may retain them in the combination of the present invention, as is illustrated in Figure 5.

The herein illustrated embodiment of the pressure control means of the present invention comprises a cylinder 14 provided with a lateral triangular boss 15 into which is threaded a valve stem 16 provided with the usual cap 17. The stem 16 is provided with the conventional or any suitable check valve unit or "valve insides" (not shown) adapted to permit unrestricted flow of air through the stem to inflate the tires and to prevent outward flow of air through the same.

The inner end of the valve stem 16 communicates with the passage 18, which in turn connects with the passage 19 having its terminals in the cylinder bore 20 at points spaced from each other and from the ends of the cylinder.

The cylinder 14 is provided with caps or end closures 21—21 with which may be associated gaskets 22—22, the caps 21—21 being provided with inwardly projecting hollow bosses 23—23 having their axes coincident with the axis of the normally balanced piston, presently to be described.

Extending into each of the cylinder caps 21 is a metal conduit 24, one flanged end of which is held in communication with the hollow boss of the cap by an externally threaded clamping collar 25. The other flanged end of each conduit 24 is held tightly against one of the inflation stems 12 by means of an internally threaded clamping collar 26 cooperating with the external threads of such stem. Resilient gaskets 27—27 are provided at the flanged ends of the conduits 24 for an obvious purpose. In the illustrated embodiment of my invention, the cylinder 14 and parts carried thereby are supported upon and by the inflation stems 12—12 of the twin tires A and B through the agency of the metal conduits 24—24. While this particular arrangement has certain advantages, it is not indispensable. The important requirement is that the cylinder 14 be supported by or with the wheel or wheels by which the twin tires A and B are carried and that the ends of the cylinder be in communication with the air containing elements of the tires.

Disposed in the cylinder bore 20, and normally located midway between the ends of the said cylinder bore is a rodless piston 28 having reduced diameter ends 29—29 carrying cup leathers 30—30, each cup leather facing the greater diameter portion of the piston. These cup leathers are of somewhat unusual construction, i. e. each of them is provided with a central boss or integral protuberance 31 presented toward one of the cylinder cap bosses 23. The cup leathers 30—30 are backed up by metal stampings 32—32 which are centrally apertured to receive and expose the portions 31 of the cup leathers, each of these stampings being conformed to receive the smallest diameter convolution of a spring 33; the spring in each instance being in the form of a conical helix, the larger diameter convolution of the spring bearing against one of the cylinder caps.

It will thus be seen that the piston just described divides the cylinder into two chambers between which communication normally is afforded by the passage 19 between the terminals of which passage the piston normally is disposed. The springs 33—33 preferably are quite weak, their function being to balance the piston in the position of Figure 1, before the tires are inflated and after the tires are inflated whenever the pressures within the tires are equal.

In Figure 4 I have illustrated a modified form of piston which, if desired, may be placed into the combination of Figure 1 as a substitute for the piston therein shown. This modified form of piston comprises a body portion 34, a sealing ring 35, and is provided at its ends with hollow bosses 36—36 which receive and hold discs 37 of rubber or other suitable resilient material. If the walls of the hollow bosses 36 are relatively thin, they may be distorted slightly firmly to grip and hold the resilient discs 37. It will also be noted that the bosses 36 are adapted to receive the inner or smallest diameter convolutions of the balancing springs 33. It will be noted that the piston of Figure 4 is provided with a very small diameter axial bore 38 which is disposed in alignment with central apertures 39—39 in the resilient discs 37—37. Therefore, when the piston of Figure 4 is employed, restricted communication always is afforded between the twin tires through the piston passage 38 whenever the twin tires are in communication with the cylinder 14.

In Figure 5 I have illustrated a modified arrangement for connecting both of the twin tires with the cylinder 14. In accordance with the arrangement of Figure 5, each of the tire inflation stems 12 is provided with the usual "valve insides" 40 and each of the conduits 24 is provided with means for unseating the valve of the inflation stem when the conduit 24 is operatively connected with the inflation stem. In other words, the valve of each inflation stem is placed in open position and out of commission when the inflation stem is connected with the cylinder 14 through one of the conduits 24. However, the said valve assumes its closed position and becomes fully operative as soon as the conduit 24 is removed from the inflation stem in which the valve is located.

By virtue of the constructions herein illustrated and described, the twin tires may be inflated simultaneously and to absolutely equal pressures by a pump or inflation hose applied to the valve stem 16 which is in communication with both tires.

In the normal operation of the twin tires an abnormal increase in the pressure existing within one of the tires will be reflected by an increase in pressure on the other tire due to the communication normally afforded between the tires. Thus, for example, if one of the tires receives a severe impact which momentarily increases the pressure therein, air will flow from the tire receiving the impact into the cylinder bore 20, around piston 28, through bore 19, and thence back into the cylinder bore and to the other tire. This arrangement tends to avoid the creation of excess pressure within either tire due to impacts of the road and also protects the tires by distributing the strain, caused by a sudden increase of pressure within one of them, over the insides of both of the tires. Under a very severe impact sustained by one of the tires, the piston 28 may move slightly to speed up the equalization of pressures within the twin tires, the piston of course always returning to the intermediate position when the pressures within the twin tires are equal.

On some roads, for instance crown top roads, twin tires of the kind which my invention relates meet a condition where under ordinary conditions one of a pair of equally inflated twin tires will for a short time, or even for a very long time sustain practically all of the load which properly should be thrown on both tires. The combination of the present invention tends to compensate for such a situation. If one of the tires is running on a higher road surface than the other tire, it will momentarily carry most of the load. Air will then flow from the overly burdened tire to the other tire, with the result that the latter becomes more greatly inflated,—usually to an extent such that its tread is pressed into load sustaining contact with the road. This last mentioned advantage of the arrangement of the present invention is realized to the greatest extent when the twin tires to which the present improvements are applied are of the balloon type.

Referring now particularly to the arrangement of Figure 1, I will call attention to the fact that a slight puncture or other slow leak affecting one of the tires will cause the uninjured tire to become deflated simultaneously with the injured tire,—this due to the communication normally afforded between the tires through the cylinder passage 19. It is desirable, in the use of twin tires, for both of them to become deflated when either suffers a slight puncture or otherwise exhibits a slow leak. This is so because the twin tires are provided to carry a load which neither of them is calculated satisfactorily to sustain without injury. Therefore, the present invention insures that whenever one of the tires suffers from a slow leak, both of the twin tires will become deflated and the driver will be forced to correct the difficulty before proceeding.

The present invention, however, takes cognizance of the fact that it would be unsafe, with the vehicle travelling at high speed, to permit a blow-out or a large puncture in one of the tires to cause immediate deflation of the other tire. Let us assume that the tire connected with the left hand end of the cylinder bore 20 (Figure 1) suddenly blows out with the vehicle in motion. The result of the blow-out is a sudden reduction in the pressure exerted upon the left hand end of the piston 28. The piston, therefore, moves rapidly to the left under the influence of the pressure existing within the uninjured tire. Further escape of air from the uninjured tire is then prevented by engagement of the left hand end of the piston with that one of the hollow bosses 23 which normally affords communication between the cylinder bore and the injured tire. Moreover, the movement of the piston to the left closes the left hand end of the cylinder passage 19, the cup leather at the left hand end of the piston 28 being disposed to prevent the escape past it of pressure from the said cylinder bore 19. If the tire connected with the right hand end of the cylinder bore 20 were suddenly to blow out or to suffer a severe puncture, the operation just described would be the same, except that in this instance the normally balanced piston 28 would suddenly snap to the right in response to pressure from the uninjured tire exerted upon the left hand end of the piston.

When the piston of Figure 4 is employed, a sudden blow-out or severe puncture suffered by either of the twin tires causes sudden movement of the piston to prevent an immediate deflation of the injured tire. Nevertheless, due to the restricted passage 38 through the piston 34, the uninjured tire will surely but slowly deflate after the other tire has sustained a blow-out or severe puncture. This last mentioned arrangement makes it impossible for the driver of the vehicle to travel for any considerable distance on the uninjured tire after the other one of the twin tires has sustained a severe puncture or blow-out.

The arrangement of Figure 5 is of particular advantage when the device of my invention comprises a piston of the kind illustrated in Figure 1. This arrangement of Figure 5 makes it possible to apply the control device of the present invention to a pair of twin tires without preliminarily deflating them and also makes it possible to replace one of the twin tires on the road without necessarily deflating the other tire. Thus, for example, if one of the tires suffers a blow-out, it is possible to replace that tire without suffering an escape of the air which is being retained in the other tire as and for the reasons hereinbefore explained.

Prior to replacing the injured tire, the conduit 24 communicating with the valve inflation stem of the uninjured tire, is removed, the pressure then being held within the uninjured tire by the valve with which its stem is provided. After the replaced tire has been inflated to substantially the same pressure as the uninjured tire, the devices of the present invention are applied. This advantage (afforded by the arrangement of Figure 5) of replacing one of the twin tires without necessarily suffering deflation of the other tire, is of considerable practical importance when inflation on the road must be accomplished with a manually operated pump.

Having thus illustrated and described my invention, what I claim is new and desire to secure by Letters Patent of the United States, is:

1. In a pressure exchange device for twin tires, means including a cylinder affording communication between said tires, a rodless spring balanced piston normally positioned intermediate the ends of said cylinder, facings on both ends of said piston, and heads secured to the ends of said cylinder having hollow bosses inwardly projecting therefrom adapted to cooperate with said piston facings for controlling communication between said tires, a bleeder opening through said piston in alignment with the hollow bosses whereby when the piston is in contact with either boss communication between the tires is restricted but not entirely cut off.

2. An inflation and pressure exchange device for twin tires comprising a body having a chamber communicating at its ends with both tires, said body portion provided with an inlet passage branching to communicate with the chamber at opposite sides of its middle portion, said branching passages thereby constituting a by-pass around said middle portion, a spring balanced piston valve normally occupying the middle portion of the chamber between the ends of said by-pass and adapted to be moved by unbalanced air pressure to a position to close the by-pass thereby to prevent an abrupt decrease in the pressure of one tire from being accompanied by an abrupt decrease in the pressure of the other tire.

3. An inflation and pressure exchange device for twin tires comprising a cylinder provided with an inlet passage branching to communicate with the interior thereof at opposite sides of its middle portion, said branching passages thereby constituting a by-pass around the middle portion, a spring balanced piston valve normally occupying the middle portion of the cylinder between the ends of said by-pass, facings on both ends of said piston valve, and heads secured to the cylinder having hollow bosses inwardly projecting therefrom and communicating with the respective tires adapted to cooperate with said piston valve facings when such piston valve is moved by unbalanced air pressure to a position against one of said bosses, and a bleeder opening through said piston valve in alignment with the hollow bosses whereby when the piston valve is in contact with either boss communication between said tires is restricted but not entirely cut off.

In witness whereof, I hereunto subscribe my name this 16th day of June, 1931.

JAMES O. BASTA.